US012579051B2

(12) United States Patent
Echague et al.

(10) Patent No.: US 12,579,051 B2
(45) Date of Patent: Mar. 17, 2026

(54) SYSTEMS AND METHODS FOR A FEATURE DATA PLATFORM

(71) Applicant: Harness Inc., San Francisco, CA (US)

(72) Inventors: Patricio Echague, Redwood City, CA (US); Joshua Sirota, Redwood City, CA (US); Robert Grassian, San Mateo, CA (US)

(73) Assignee: Harness Inc., San Francisco, CA (US)

( * ) Notice: Subject to any disclaimer, the term of this patent is extended or adjusted under 35 U.S.C. 154(b) by 0 days.

(21) Appl. No.: 18/118,633

(22) Filed: Mar. 7, 2023

(65) Prior Publication Data

US 2023/0367695 A1    Nov. 16, 2023

Related U.S. Application Data

(60) Provisional application No. 63/317,692, filed on Mar. 8, 2022.

(51) Int. Cl.
*G06F 13/00*         (2006.01)
*G06F 9/44*          (2018.01)
*G06F 11/3604*       (2025.01)
*G06F 16/28*         (2019.01)

(52) U.S. Cl.
CPC ................................. *G06F 11/3616* (2013.01)

(58) Field of Classification Search
CPC ............. G06F 11/3616; G06F 11/3476; G06F 11/3664; G06F 11/3684; G06F 11/3692
See application file for complete search history.

(56) References Cited

U.S. PATENT DOCUMENTS

| | | | | |
|---|---|---|---|---|
| 6,247,128 B1* | 6/2001 | Fisher | ..................... | H04L 67/12 |
| | | | | 713/1 |
| 7,603,476 B1* | 10/2009 | Hofmann | ................ | G06F 9/546 |
| | | | | 709/236 |
| 8,191,044 B1* | 5/2012 | Berlik | ................. | G06F 11/3672 |
| | | | | 717/124 |
| 10,430,439 B1* | 10/2019 | Wilson | .................. | G06F 16/283 |
| 10,554,416 B1* | 2/2020 | Yavuz | ................... | H04L 9/3242 |
| 2013/0179982 A1* | 7/2013 | Bridges | .............. | G06Q 30/0185 |
| | | | | 726/26 |

(Continued)

*Primary Examiner* — S. Sough
*Assistant Examiner* — Mohammad H Kabir

(57)                ABSTRACT

Methods and systems for providing a feature data platform for providing feature level context data for a configurable application are describe. The method can include receiving, from an application developer system, an audit log associated with a configurable application, the configurable application comprising a set of feature flags that configure the configurable application during execution of the application, the audit log providing a definition of a format of feature flag impression messages generated by the configurable application. The method can also include receiving, from the configurable application, a feature flag impression message that indicates a configuration of the set of feature flags to which a user of the application was exposed to during execution of the application. Furthermore, the method can include translating the feature flag impression message into a common format of a feature data platform based on the definition of the format of the feature flag impression messages, and storing the translated feature flag impression message in a data store.

20 Claims, 11 Drawing Sheets

(56) References Cited

U.S. PATENT DOCUMENTS

| 2014/0157407 A1* | 6/2014 | Krishnan | G06F 21/53 |
| | | | 726/22 |
| 2019/0095440 A1* | 3/2019 | Chakra | G06F 16/1734 |
| 2022/0038330 A1* | 2/2022 | Dutta | H04L 41/0895 |

* cited by examiner

400

START

EXECUTE AN APPLICATION, CONFIGURED WITH ONE OR MORE FEATURE FLAG CONFIGURATIONS, THE APPLICATION INCLUDING FEATURE FLAG AND/OR EVENT TRACKING　402

GENERATE AND TRANSMIT MESSAGE(S) THAT REPORT FEATURE FLAG IMPRESSION(S) AND/OR EVENTS WITHIN THE EXECUTING APPLICATION TO A FEATURE DATA PLATFORM　404

END

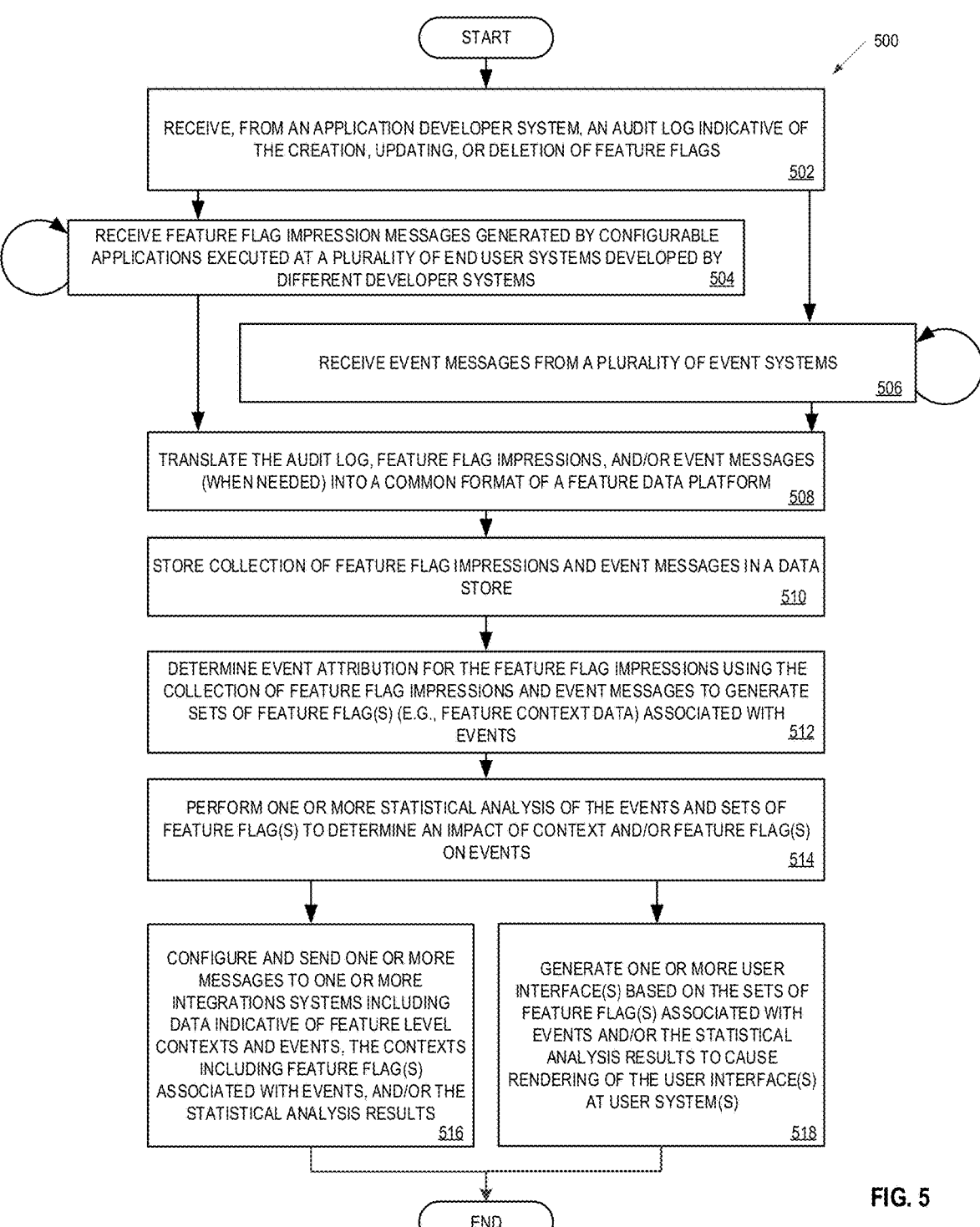

START

500

RECEIVE, FROM AN APPLICATION DEVELOPER SYSTEM, AN AUDIT LOG INDICATIVE OF THE CREATION, UPDATING, OR DELETION OF FEATURE FLAGS
502

RECEIVE FEATURE FLAG IMPRESSION MESSAGES GENERATED BY CONFIGURABLE APPLICATIONS EXECUTED AT A PLURALITY OF END USER SYSTEMS DEVELOPED BY DIFFERENT DEVELOPER SYSTEMS
504

RECEIVE EVENT MESSAGES FROM A PLURALITY OF EVENT SYSTEMS
506

TRANSLATE THE AUDIT LOG, FEATURE FLAG IMPRESSIONS, AND/OR EVENT MESSAGES (WHEN NEEDED) INTO A COMMON FORMAT OF A FEATURE DATA PLATFORM
508

STORE COLLECTION OF FEATURE FLAG IMPRESSIONS AND EVENT MESSAGES IN A DATA STORE
510

DETERMINE EVENT ATTRIBUTION FOR THE FEATURE FLAG IMPRESSIONS USING THE COLLECTION OF FEATURE FLAG IMPRESSIONS AND EVENT MESSAGES TO GENERATE SETS OF FEATURE FLAG(S) (E.G., FEATURE CONTEXT DATA) ASSOCIATED WITH EVENTS
512

PERFORM ONE OR MORE STATISTICAL ANALYSIS OF THE EVENTS AND SETS OF FEATURE FLAG(S) TO DETERMINE AN IMPACT OF CONTEXT AND/OR FEATURE FLAG(S) ON EVENTS
514

CONFIGURE AND SEND ONE OR MORE MESSAGES TO ONE OR MORE INTEGRATIONS SYSTEMS INCLUDING DATA INDICATIVE OF FEATURE LEVEL CONTEXTS AND EVENTS, THE CONTEXTS INCLUDING FEATURE FLAG(S) ASSOCIATED WITH EVENTS, AND/OR THE STATISTICAL ANALYSIS RESULTS
516

GENERATE ONE OR MORE USER INTERFACE(S) BASED ON THE SETS OF FEATURE FLAG(S) ASSOCIATED WITH EVENTS AND/OR THE STATISTICAL ANALYSIS RESULTS TO CAUSE RENDERING OF THE USER INTERFACE(S) AT USER SYSTEM(S)
518

END

FIG. 5

16 Metrics

| Metrics with significant desired impact. | Metrics with significant undesired impact. | Metrics with significant inconclusive impact. | Metrics with statistical comparison not possible. |
|---|---|---|---|
| 6 | 0 | 8 | 1 |

Key metrics

+ Create Metric

Bookings per User  •••

Significant desired impact ☺

⊕ 13.12%

Impact lies between
+11.45% and +14.79%

Booking Avg Price per User  •••

Significant desired impact ☺

⊕ 10.49%

Impact lies between
+9.37% and +11.60%

Organizational metrics    Search metric

Total Booking Dollars per User  •••

Significant desired impact ☺

⊕ 25.17%

Impact lies between
+22.64% and +27.71%

Total Revenue per User  •••

Significant desired impact ☺

⊕ 25.17%

Impact lies between
+22.63% and +27.71%

Bookings per Platinum User  •••

Significant desired impact ☺

⊕ 14.36%

Impact lies between
+6.42% and +22.29%

Bookings - Percent of Unique User  •••

Significant desired impact ☺

⊕ 10.67%

Impact lies between
+8.87% and +12.46%

Avg Nights per Platinum User  •••

Statistically inconclusive ☺
No significant impact detected

⊕ 0.90%

Impact lies between
-2.92% and +4.72%

Avg Nights per Premium User  •••

Statistically inconclusive ☺
No significant impact detected

⊖ 0.79%

Impact lies between
-2.68% and +1.10%

Average Rooms Per Platinum User  •••

Statistically inconclusive ☺
No significant impact detected

⊕ 0.44%

Impact lies between
-0.57% and +1.45%

Average Page Load - Percentage Alert  •••

Statistically inconclusive ☺
No significant impact detected

⊕ 0.31%

Impact lies between
-0.24% and +0.87%

Payment Processing Time Per User  •••

Statistically inconclusive ☺
No significant impact detected

⊕ 0.31%

Impact lies between
-0.32% and +0.94%

Average Nights Per User  •••

Statistically inconclusive ☺
No significant impact detected

⊖ 0.23%

Impact lies between
-1.44% and +0.98%

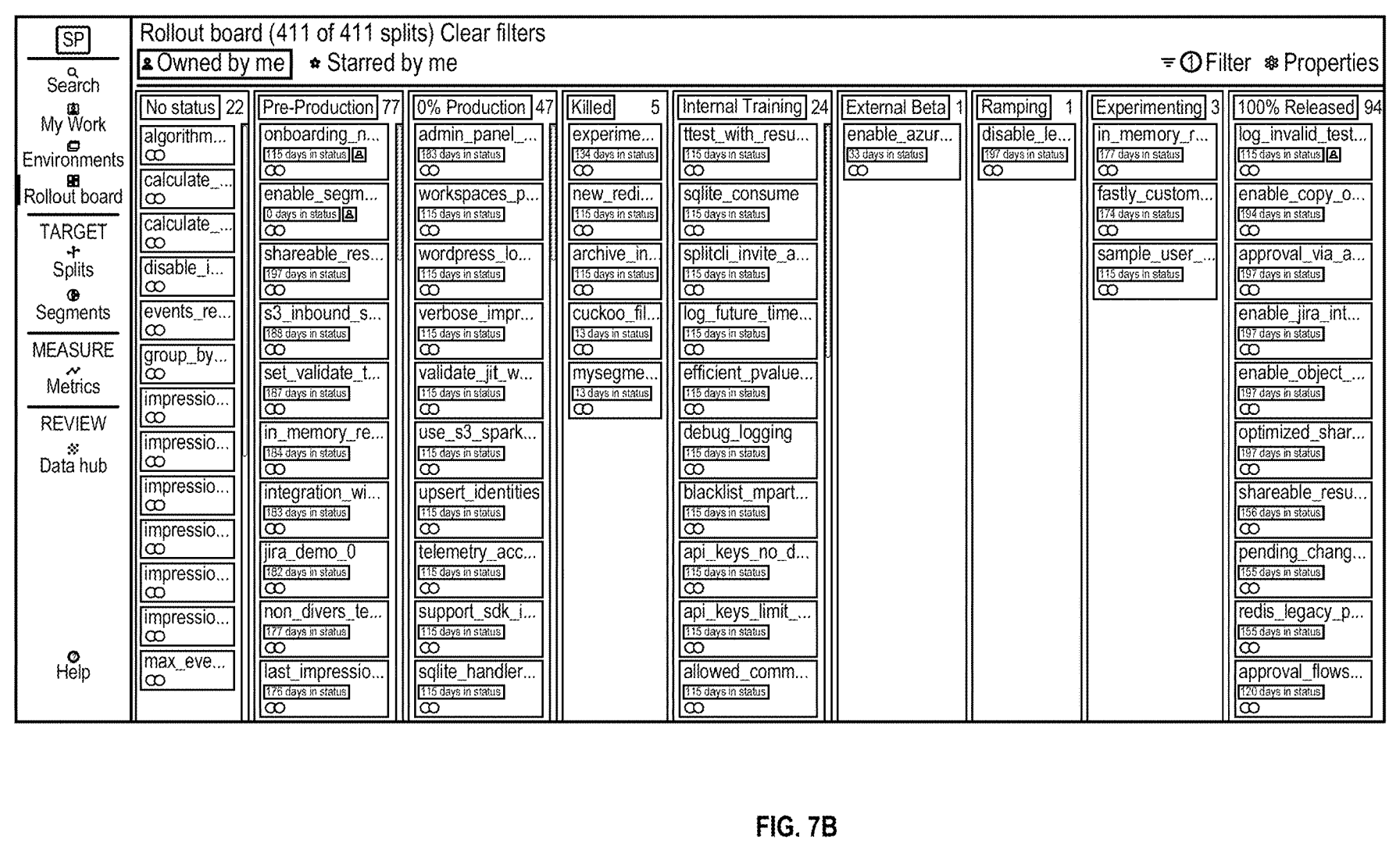

Search

My Work

Environments

Rollout board

TARGET

Splits

Segments

MEASURE

Metrics

REVIEW

Data hub

Help

Rollout board (411 of 411 splits) Clear filters

Owned by me   Starred by me

Filter   Properties

No status 22
- algorithm...
- calculate...
- calculate...
- disable_i...
- events_re...
- group_by...
- impressio...
- impressio...
- impressio...
- impressio...
- impressio...
- impressio...
- max_eve...

Pre-Production 77
- onboarding_n... 115 days in status
- enable_segm... 0 days in status
- shareable_res... 197 days in status
- s3_inbound_s... 188 days in status
- set_validate_t... 187 days in status
- in_memory_re... 184 days in status
- integration_wi... 183 days in status
- jira_demo_0 182 days in status
- non_divers_te... 177 days in status
- last_impressio... 176 days in status

0% Production 47
- admin_panel_... 183 days in status
- workspaces_p... 115 days in status
- wordpress_lo... 115 days in status
- verbose_impr... 115 days in status
- validate_jit_w... 115 days in status
- use_s3_spark... 115 days in status
- upsert_identities
- telemetry_acc... 115 days in status
- support_sdk_i... 115 days in status
- sqlite_handler... 115 days in status

Killed 5
- experime... 134 days in status
- new_redi... 115 days in status
- archive_in... 115 days in status
- cuckoo_fil... 13 days in status
- mysegme... 13 days in status

Internal Training 24
- ttest_with_resu... 115 days in status
- sqlite_consume 115 days in status
- splitcli_invite_a... 115 days in status
- log_future_time... 115 days in status
- efficient_pvalue... 115 days in status
- debug_logging 115 days in status
- blacklist_mpart... 115 days in status
- api_keys_no_d... 115 days in status
- api_keys_limit_... 115 days in status
- allowed_comm... 115 days in status

External Beta 1
- enable_azur... 83 days in status

Ramping 1
- disable_le... 197 days in status

Experimenting 3
- in_memory_f... 177 days in status
- fastly_custom... 174 days in status
- sample_user_... 115 days in status

100% Released 94
- log_invalid_test... 115 days in status
- enable_copy_o... 94 days in status
- approval_via_a... 197 days in status
- enable_jira_int... 197 days in status
- enable_object_... 197 days in status
- optimized_shar... 197 days in status
- shareable_resu... 156 days in status
- pending_chang... 155 days in status
- redis_legacy_p... 155 days in status
- approval_flows... 120 days in status

FIG. 7B

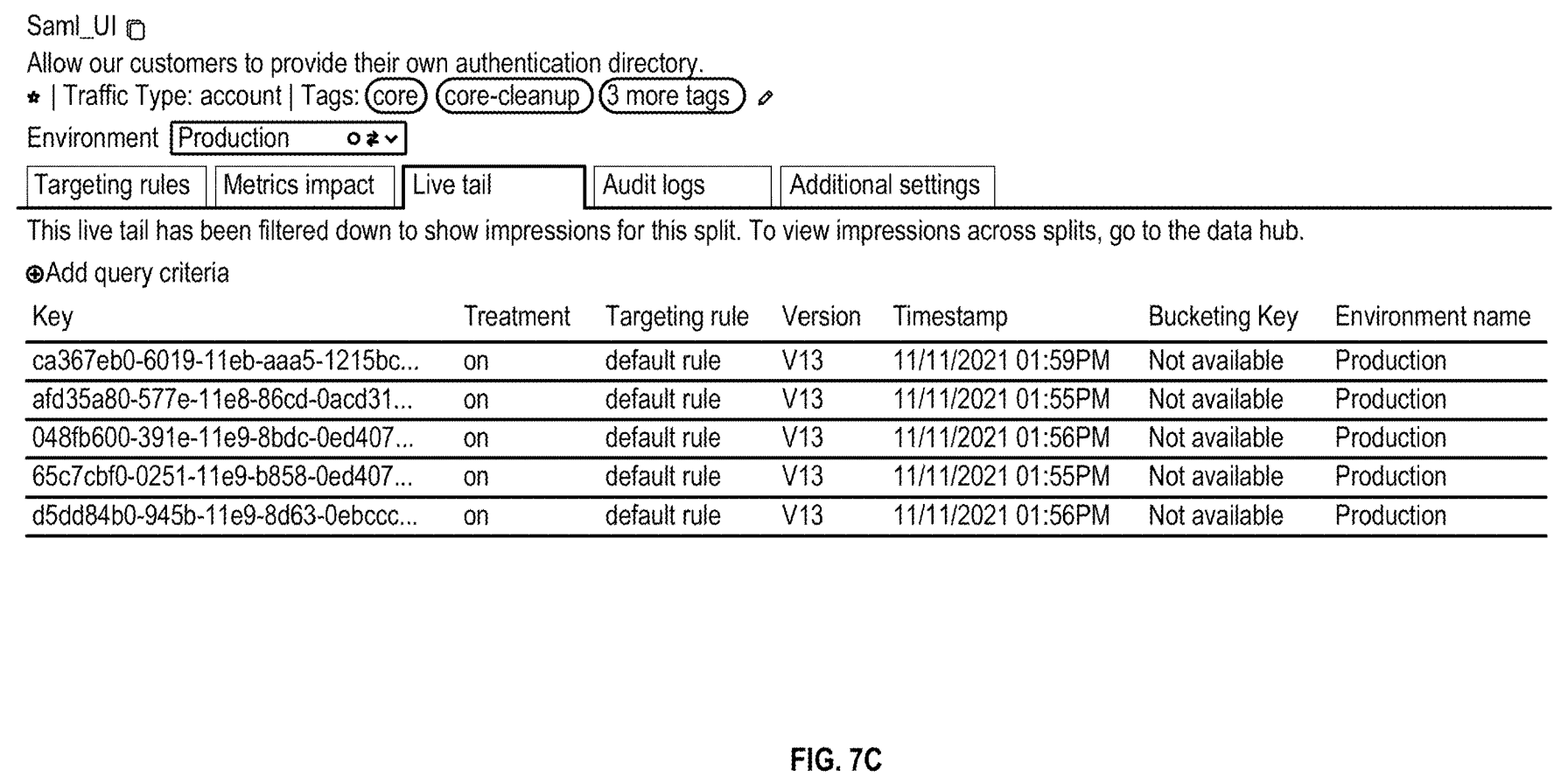

Saml_UI

Allow our customers to provide their own authentication directory.

* | Traffic Type: account | Tags: core core-cleanup 3 more tags

Environment Production

| Targeting rules | Metrics impact | Live tail | Audit logs | Additional settings |

This live tail has been filtered down to show impressions for this split. To view impressions across splits, go to the data hub.

⊕ Add query criteria

| Key | Treatment | Targeting rule | Version | Timestamp | Bucketing Key | Environment name |
|---|---|---|---|---|---|---|
| ca367eb0-6019-11eb-aaa5-1215bc... | on | default rule | V13 | 11/11/2021 01:59PM | Not available | Production |
| afd35a80-577e-11e8-86cd-0acd31... | on | default rule | V13 | 11/11/2021 01:55PM | Not available | Production |
| 048fb600-391e-11e9-8bdc-0ed407... | on | default rule | V13 | 11/11/2021 01:56PM | Not available | Production |
| 65c7cbf0-0251-11e9-b858-0ed407... | on | default rule | V13 | 11/11/2021 01:55PM | Not available | Production |
| d5dd84b0-945b-11e9-8d63-0ebccc... | on | default rule | V13 | 11/11/2021 01:56PM | Not available | Production |

FIG. 7C

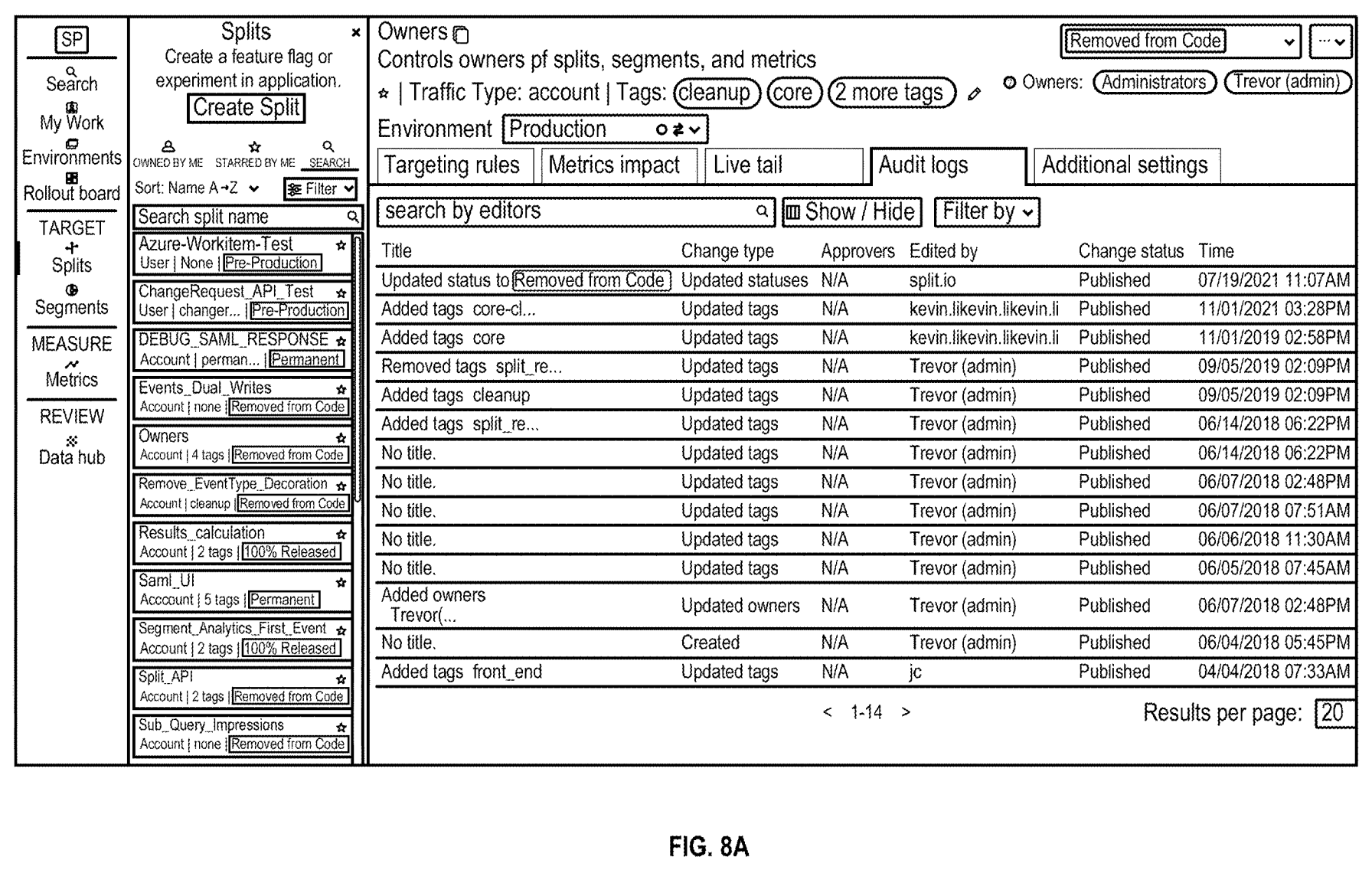

Splits ✕

Create a feature flag or experiment in application.

[Create Split]

OWNED BY ME   STARRED BY ME   SEARCH

Sort: Name A→Z ▾   [⌘ Filter ▾]

Search split name

| | |
|---|---|
| Azure-WorkItem-Test ☆ | User \| None \| Pre-Production |
| ChangeRequest_API_Test ☆ | User \| changer... \| Pre-Production |
| DEBUG_SAML_RESPONSE ☆ | Account \| perman... \| Permanent |
| Events_Dual_Writes ☆ | Account \| none \| Removed from Code |
| Owners ☆ | Account \| 4 tags \| Removed from Code |
| Remove_EventType_Decoration ☆ | Account \| cleanup \| Removed from Code |
| Results_calculation ☆ | Account \| 2 tags \| 100% Released |
| Saml_UI ☆ | Acccount \| 5 tags \| Permanent |
| Segment_Analytics_First_Event ☆ | Account \| 2 tags \| 100% Released |
| Split_API ☆ | Account \| 2 tags \| Removed from Code |
| Sub_Query_Impressions ☆ | Account \| none \| Removed from Code |

Sidebar: SP | Search | My Work | Environments | Rollout board

TARGET: Splits | Segments
MEASURE: Metrics
REVIEW: Data hub

---

Owners ⊡

Controls owners pf splits, segments, and metrics

☆ | Traffic Type: account | Tags: (cleanup) (core) (2 more tags) ✎

Removed from Code ▾   ▾   ◉ Owners: (Administrators) (Trevor (admin))

Environment [Production]

Tabs: Targeting rules | Metrics impact | Live tail | Audit logs | Additional settings search by editors   [▦ Show / Hide]   [Filter by ▾]

| Title | Change type | Approvers | Edited by | Change status | Time |
|---|---|---|---|---|---|
| Updated status to [Removed from Code] | Updated statuses | N/A | split.io | Published | 07/19/2021 11:07AM |
| Added tags core-cl... | Updated tags | N/A | kevin.likevin.likevin.li | Published | 11/01/2021 03:28PM |
| Added tags core | Updated tags | N/A | kevin.likevin.likevin.li | Published | 11/01/2019 02:58PM |
| Removed tags split_re... | Updated tags | N/A | Trevor (admin) | Published | 09/05/2019 02:09PM |
| Added tags cleanup | Updated tags | N/A | Trevor (admin) | Published | 09/05/2019 02:09PM |
| Added tags split_re... | Updated tags | N/A | Trevor (admin) | Published | 06/14/2018 06:22PM |
| No title. | Updated tags | N/A | Trevor (admin) | Published | 06/14/2018 06:22PM |
| No title. | Updated tags | N/A | Trevor (admin) | Published | 06/07/2018 02:48PM |
| No title. | Updated tags | N/A | Trevor (admin) | Published | 06/07/2018 07:51AM |
| No title. | Updated tags | N/A | Trevor (admin) | Published | 06/06/2018 11:30AM |
| No title. | Updated tags | N/A | Trevor (admin) | Published | 06/05/2018 07:45AM |
| Added owners Trevor(... | Updated owners | N/A | Trevor (admin) | Published | 06/07/2018 02:48PM |
| No title. | Created | N/A | Trevor (admin) | Published | 06/04/2018 05:45PM |
| Added tags front_end | Updated tags | N/A | jc | Published | 04/04/2018 07:33AM |

< 1-14 >

Results per page: 20

FIG. 8A

SYSTEMS AND METHODS FOR A FEATURE DATA PLATFORM

PRIORITY

The present application is a non-provisional application of, and claims the benefit of, U.S. Provisional Patent Application No. 63/317,692, filed Mar. 8, 2022, which is incorporated by reference herein in its entirety.

TECHNICAL FIELD

Embodiments of the invention relate to the field of software application development and testing, and more particularly, to feature level context and intelligence in software application development and testing.

BACKGROUND

Software applications, such as web page based applications, mobile device applications, desktop computer system applications, etc., are created by software developers. The software applications are then distributed to end users and run on end user computer systems (e.g., run on a user's personal computer, mobile computing device, served to a user from a web server, etc.). From usage of a software application, a developer may determine that changes to the application are necessary and/or desired for various reasons. For example, a software application may contain a bug causing the application to act in undesirable or unforeseen ways, and may even prevent the software application from running. As another example, a developer may want to change a user interface element based on experiences and/or feedback of real world users of the application. As yet another example, a software application update intended to allow a real world user to improve service bookings may actually result in fewer service bookings. As yet another example, a new version of a web page may be intended to decrease page load time, when in fact it increases page load time. Thus, the effectiveness of the application in terms of operational performance and user experience may influence updates to the application.

Software applications, however, are becoming increasingly complex in terms of the number and characteristics of user interface elements, user interface layout, functional elements, options that may be deployed in an application, different deployments to various user groups, as well as other application implementation elements that may impact user experience with an application. With the increase in complexity, software development has become increasingly granular. That is, software elements, features, etc. may be independently developed by different engineer(s), who are not necessarily aware of the development and/or changes of the elements, features, etc. of other independent development efforts. As a result, it is increasingly difficult to determine what feature, set of features, or other combination of new/changed development efforts have had a positive and/or negative impact on an overall software system being developed. In other words, a feature change by one development effort may have an impact on features that are the independent responsibility of other developers, and it is difficult to determine what the consequences of a feature change are.

Thus, testing of the deployment of new and/or updated application features is often not sufficiently accurate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 is a flow diagram of one embodiment of a method for a feature data platform server gathering external feature flags and determining feature data context from applications developed by multiple different developer systems.

FIG. 7A illustrates an embodiment of a graphical user interface that provides statistical analysis results.

FIG. 7B illustrates an embodiment of a rollout board user interface.

FIG. 7C illustrates an embodiment of a graphical user interface that provides a visualization of real time exposure of user system(s) to feature flags.

FIG. 8A illustrates an embodiment of a graphical user interface that provides a visualization of received audit log data in an audit log user interface.

DETAILED DESCRIPTION

Figure 1:
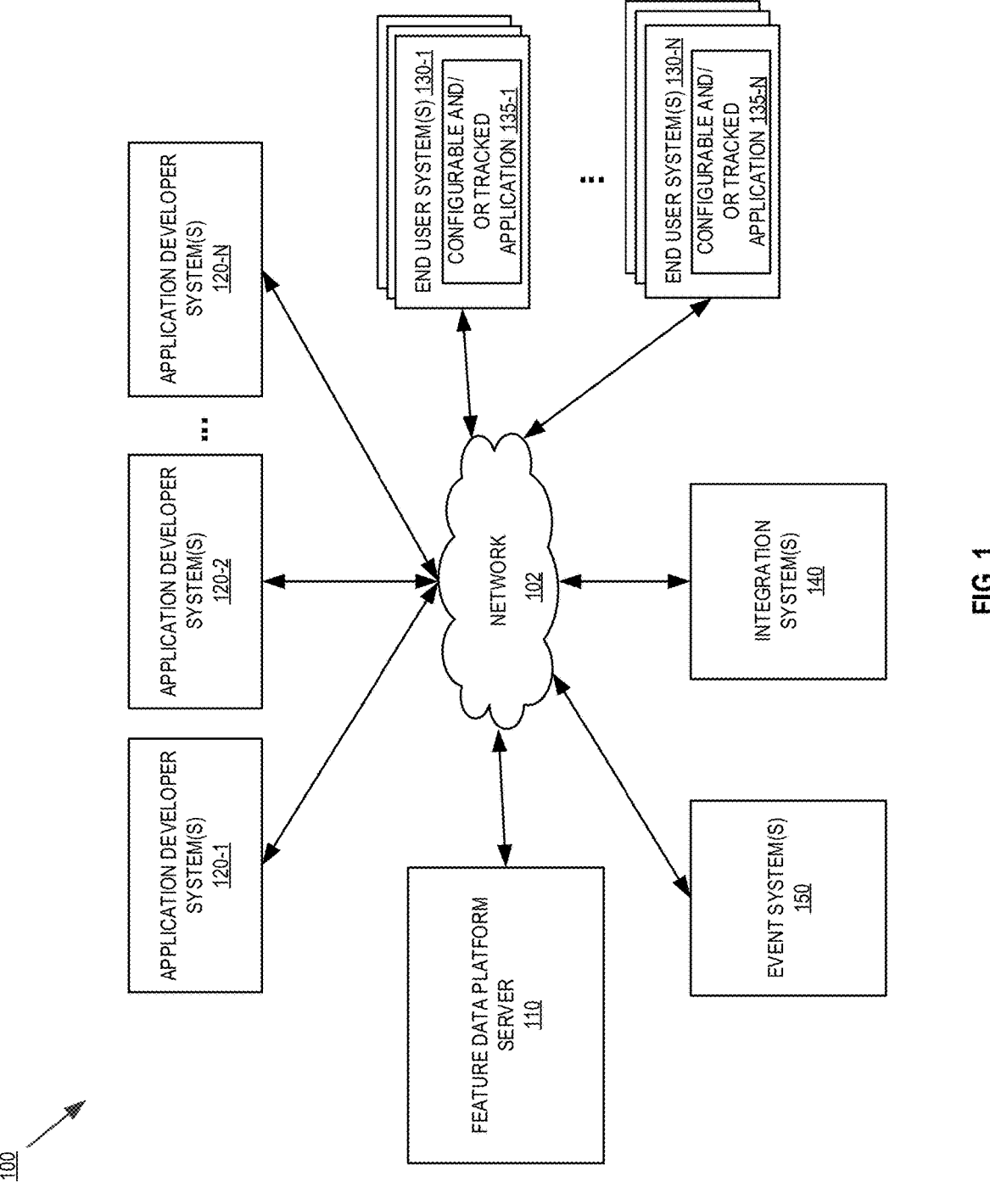
FIG. 1 is a block diagram of an exemplary system architecture for providing a feature development platform to a plurality of different developer systems.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "translating", "determining", "performing", "generating", "executing", "storing", "configuring", "transmitting", "determining", "integrating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for providing a feature development platform to a plurality of different developer systems.

In one embodiment, the system 100 includes a plurality of user systems, such as end user system 130-1 to user system 130-N, feature data platform server 110, application developer system(s) 120-1 through 120-N, event system(s) 150, and integration system(s) 140. In one embodiment, end user system 130-1 to user system 130-N may be personal computing devices, such as a desktop computer, laptop computer, tablet computer, mobile computing device, mobile communication device, wearable devices, gaming devices, medical devices, or other computer systems upon which configurable applications 135-1 to 135-N may be run. The feature data platform server 110, application developer system(s) 120-1 through 120-N, event system(s) 150, and integration system(s) 140 may also be computing devices, such as one or more server computers, desktop computers, etc.

The end user systems 130-1 through 130-N, feature data platform server 110, application developer system(s) 120-1 through 120-N, event system(s) 150, and integration system(s) 140 may be coupled to a network 102 and communicate with one another using any of the standard protocols for the exchange of information. In embodiments, secure protocols for the exchange of information may also be used. In one embodiment, one or more of the end user systems 130-1 through 130-N, feature data platform server 110, application developer system(s) 120-1 through 120-N, event system(s) 150, and integration system(s) 140 may run on one Local Area Network (LAN) and may be incorporated into the same physical or logical system, or different physical or logical systems. Alternatively, the end user systems 130-1 through 130-N, feature data platform server 110, application developer system(s) 120-1 through 120-N, event system(s) 150, and integration system(s) 140 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, end user systems 130-1 through 130-N execute applications, such as configurable and/or tracked applications 135-1 through 135-N (referred to herein as "applications"). The applications may include any type of software application such as an application downloaded to, installed on, and run on a user system, a web based application downloaded from a server computer system and run on a user system, a mobile application where the user system is a mobile device (e.g., tablet computer, laptop computer, mobile telephone, gaming device, medical device, etc.), as well as other types of software applications. In embodiments, each application $135_i$ is developed by different application developer system(s) $120_i$. Furthermore, within each application developer system(s) $120i$, a plurality of different developer groups may each separately and independently develop one or more application features, where the application features as a whole form the application $135_i$. To support testing and analysis of features, applications 135-1 through 135-N may be configured at run time, in some embodiments using feature data platform server 110, in other embodiments from the application developer system(s) $120_i$, or a combination thereof. The runtime configuration may include using feature flags embedded within an application to control how one or more features are treated at runtime during execution of the application. Feature flags (also known as feature toggles or feature switches are a software development technique that enables certain functionality of an application (at the feature level) to be turned on and off during runtime, to configure a feature behavior, or otherwise impact how an application executes without deploying new code. This allows for better control and more experimentation over the full lifecycle of features and applications. For example, a feature may be turned on or turned off by application monitoring and configuration server 110 and/or developer system(s) $120_i$ for execution by one or more user systems $130_i$ executing the application of developer system(s) $120_i$, such as activation of a user interface element, activation of an application capability, etc., as well as a combination of such configurations of feature flags. As another example, a value may be set within an application that impacts how the application is executed by an end user system, such as specifying between different credit cards that can be accepted in a merchant user interface of the application, specifying a user group (e.g., based on device type, demographics, operating system, etc.) to receive a banner ad in a web page, as well as any other type of application configuration. As yet another example, appearance of a user interface may be altered based on a configuration value of a feature flag associated with the user interface element(s) being configured by the feature flag.

In embodiments, the different real-time configurations of running applications are referred to herein as treatments, where a treatment is configured by a set of one or more feature flags that configure one or more application features during the execution of software applications by end user systems. Note that the set of one or more feature flags impacts the user experience of the application without requiring execution of a different binary. For example, User A and User B (from user systems 130) may execute the same binary for an application 135*i*, but with different feature flags enabling different feature sets/configurations. Thus, although the user systems are executing the same application binary, the different applied treatments (e.g., sets of feature flag configurations) provide different end user experiences potentially impacting the functionality, performance, and/or efficacy of the application. Furthermore, different subsets or populations of end user systems may have different treatments applied to their respective applications during treatment efficacy experimentation. For ease of discussion, and to avoid obscuring embodiments set forth herein, the remaining discussion will assume that the applications 135*i* are the same type of application even if they have different treatments being applied.

In embodiments, each developer system (e.g., developer systems 120-1, 120-2, through 120-N), however, may use its own feature flag solution for setting treatments of application. For example, developer system(s) 120-1 may use the services of feature data platform server 110 to enable feature flag deployment, configuration, testing, and experimentation, while developer system 120-2 may use an open source feature flag data generation system, developer system 120-N may use a home grown (proprietary) feature flag data generation system, as well as using other feature flag data generation systems for user, deploying, configuring, and analyzing feature flag configurations impacting application treatments. Additionally, different development teams/ groups within developer system(s)*i* may use different feature flag deployments that combine one or more of the aforementioned techniques within the same application*i* being developed.

Thus, technical challenges may arise from the different application developer systems, or different deployments within the same system, as the feature flag data being generated may not be compatible, the configuration of a feature flags may not be associated with other feature flag configurations and thus the treatment (e.g., context of the set of feature flags) may be lacking in the feature flag data, the feature flag data and feature level context may not be available for distributing to downstream systems (e.g., integration system(s) 140) that provide data visibility, message notification, support features, etc. for which feature level context data would be useful, the analysis of the generated feature flag data may not be statistically robust, as well as other challenges in the analysis and improvement of the deployed applications 135.

In one embodiment, configurable applications 135-1 through 135-N are prepared for generating and providing feature flag data to feature data platform server 110 by developers of the application, such as by a developer associated with application developer system(s) 120*i*. In one embodiment, a user of application developer system(s) 120*i* includes a feature treatment logic within each application 135*i*, which may be a feature treatment logic of the feature data platform 110, an open source feature treatment logic, a home grown feature treatment logic (e.g., developed by the developer system 120*i*), a third party provider, or a combination of such feature treatment logics used by different developers responsible for different features within the application 135*i*. The feature treatment logic enables the developer to set, configure, toggle, etc. feature flags at user systems that are executing the application 135*i*. One embodiment of providing for and configuring the execution of applications with different treatment(s), selectively and in real time using feature treatment logic of the feature data platform server 110, is described more fully in U.S. patent application Ser. No. 15/198,498, titled "Systems and Methods for Providing Control of Application Execution", file on Jun. 30, 2016, which is incorporated herein by reference in its entirety. Another embodiment for configuring the execution of applications with different treatment(s) includes application developer system 120*i*, using the tools of an open source solution, such as Split.rb, FF4J or the like. Yet another embodiment for configuring the execution of applications with different treatment(s) includes application developer system 120*i* using a third party provider feature flag tool, such as Microsoft Azure Config Feature Manager.

These tools may provide no or limited data related to the feature level context of a feature flag (e.g., the set of feature flags a user application is exposed to), may not link the context to various events (e.g. internal or external user and/or system behavior in response to an application treatment), may not be able to provide the context data to downstream software as a service systems such as integration system(s) 140, may not be able to intermingle feature flag data and context data of different feature flag deployments (e.g., does not integrate results of open source feature flag data with another source, such as feature flag data generated using resources of the feature data platform 110), do not enable robust analysis of feature flag deployment to detect what flag(s) are associated with positive and/or negative outcomes, or any combination of these limitations.

Feature data platform server 110, in embodiments and as discussed herein, addresses technical challenges by providing systems that ingests feature flag data from any source regardless of feature flag deployment, collects and stores the ingested feature flag data regardless of source, analyzes the feature flag data to determine contexts, efficacy, experiment results, etc., and provides feature level context data to downstream integration systems.

Figure 8B:
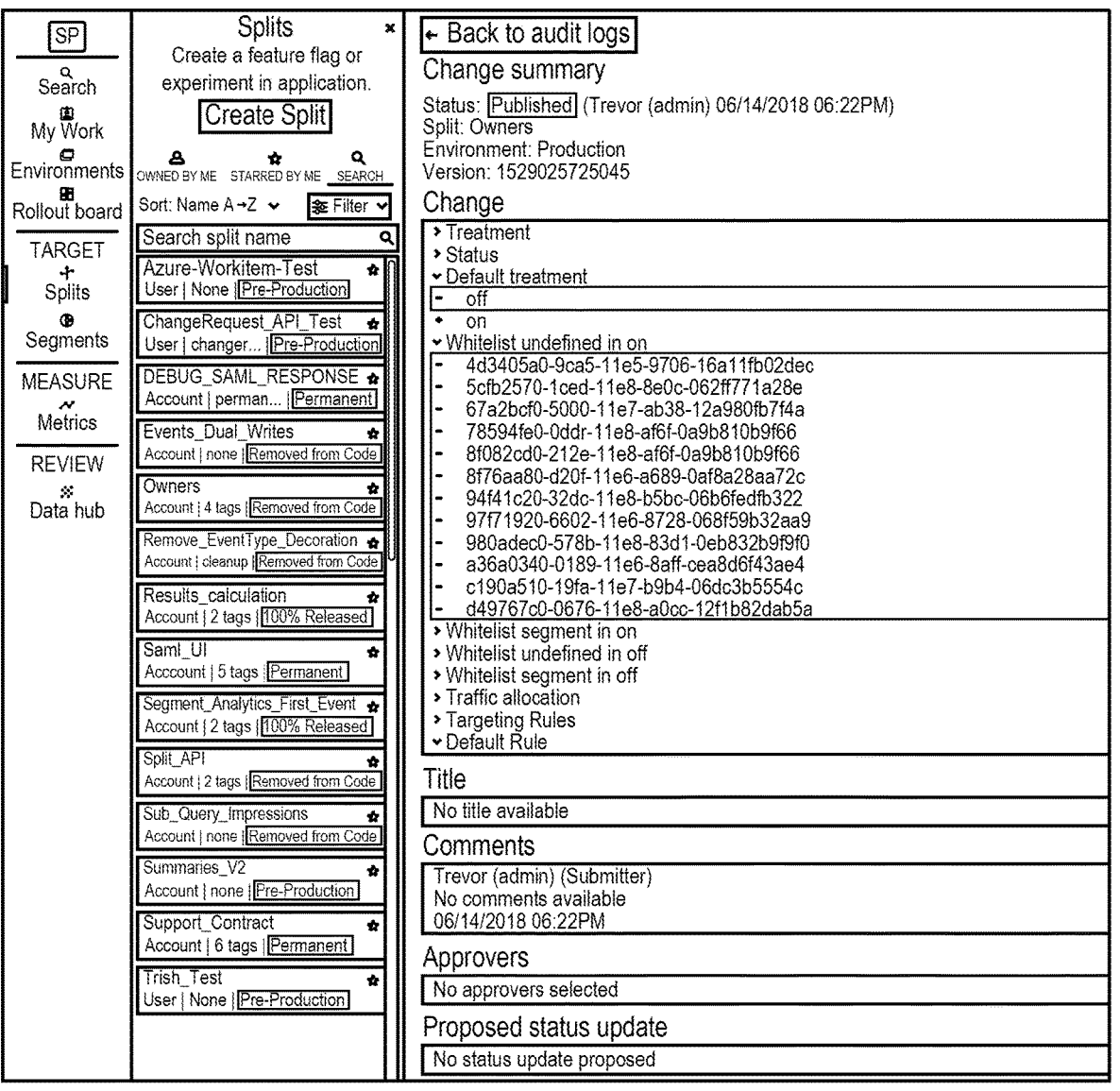
FIG. 8B illustrates another embodiment of a graphical user interface that provides a visualization of received audit log data in an audit log user interface.

In embodiments, to enable feature data platform server 110 to ingest feature flag data from any source, as discussed in greater detail below, each application developer system(s) 120*i* generates an audit log, and further incorporates one or more feature flag data generation and reporting mechanisms of the feature data platform 110. The audit log and feature flag data generation and reporting mechanisms form a type of standardized feature flag data reporting and tracking system enabling feature data platform 110 to collect, synchronize, analyze, and report useful feature level context data regarding deployments of applications with different contexts (e.g., sets of feature flags configuring different experiences within the same application). In embodiments, the audit log is a data structure (e.g., database, XML, software object, txt file, or other data structure) that reports the creation, deletion, or changing of one or more feature flag(s) within an application 135*i*. The developer system 120*i* is responsible for generating this audit log so that feature data platform 110 knows what flags are deployed within an application 135*i*, when they are deployed, their identity (e.g., identifier data of specific flags), as well as other metadata related to a feature flag enabling feature data platform 110 to identify and track feature flags. In embodiments, the audit log may be generated by an audit log generator application (e.g., a web based user interface, an SDK integrated within a development system, etc.) provided by the feature data platform server 110 to the developer system 120*i*. In other embodiments, the developer system 120*i* may generate a log file in any of a number of formats, which can be parsed and formatted for ingestion by the feature data platform server 110, for example using the log tailer techniques and or translator techniques discussed below in FIG. 3. Furthermore, in an embodiment, feature data platforms server 110 may provide a visualization of the received audit log data in an audit log user interface (FIGS. 8A and 8B), as updated by any updated audit log data, to a user of developer system 120ᵢ to that the developer may see feature flag status information.

Figure 3:
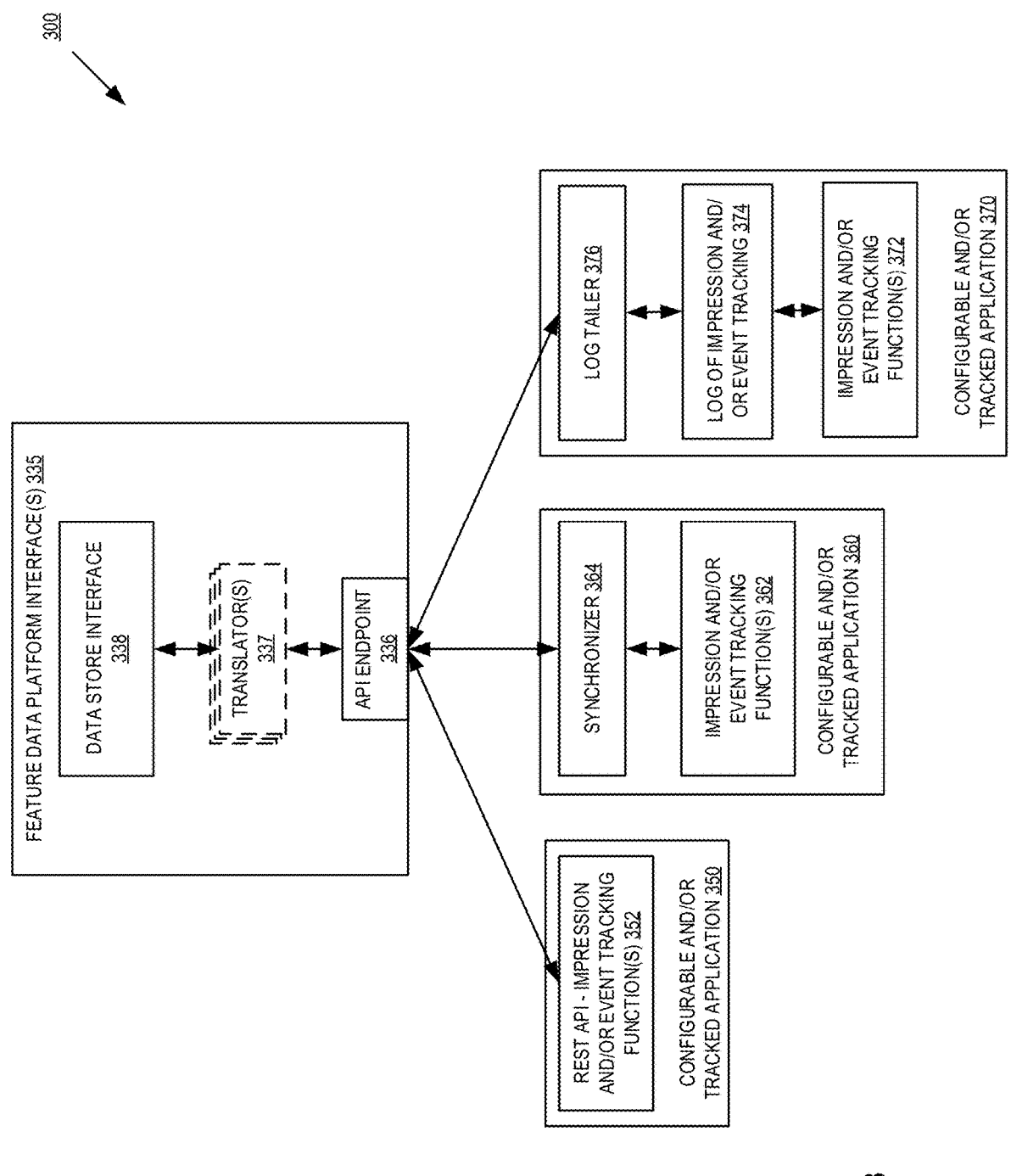
FIG. 3 is a one embodiment of a feature data platform interface interacting with different software applications to collect feature data from applications.

Furthermore, and as discussed more fully in FIG. 3, within each application 135ᵢ developed by developer system 120ᵢ, is a feature data generation and communication mechanism (e.g., a synchronizer 364, a rest API reporting mechanism 352, or a log tailer 376), which is enabled to generate feature flag data that can be consumed by the feature data platform 110. Then, upon execution of the application 135i, the feature flag data generators generate impression data that indicates what set of flag(s) a particular user is exposed to, when, and data indicative of values or configurations of each such feature flag. This impression data identifying feature flag set(s) exposed in an application at runtime to a user of user system is then either reported to, or ingested by, feature data platform server 110.

In embodiments, with the receipt of the audit log (or audit log updates) from a developer 120ᵢ, and impression events from applications 135ᵢ, feature data platform server 110 is able to ingest feature flag data from any application and/or developer system, including those from systems external to the feature data platform server 110, with minimal effort on the part of the application developer system. The feature flag data may then be stored in a data store by matching the feature flag definitions from the audit log with the feature flag reporting data (e.g., identifiers, timestamps, metadata, etc.) to enable sets of feature flags exposed to a user by an application at runtime to form a feature level context (e.g., the set of feature flags evaluated within an application forming the specific treatment of the application).

Furthermore, the feature level context data may be augmented with event data. In embodiments, event data comprises data that may not necessarily be generated from within the application being developed, but is relevant to the application's execution or efficacy. For example, increased page load time, increased processor usage, decreased sales conversions, decreased time on page of a web based application, etc. are examples of negative events associated with an application but having data not necessarily generated by the application. Instead, the data may be generated by an end user system and reported to the feature data platform (e.g., in an event message or with the feature flag data), may be captured by a remote event system(s) 150 (e.g., a CRM system, a data analytics system, a payment processing system, a web server, etc. capturing user behavioral data and/or system data), or a combination thereof. Furthermore, events may also be positive, such as decreased page load time, increase sales conversion, decreased time to selecting a user interface element, etc. These events, based on when they occurred may be attributed to the feature flag data to associate the event with the feature context data. For example, one or more identifiers (e.g., user identifiers, application identifiers, etc.) may be used to link feature flag context data to event data. That is, in embodiments, event attribution links events (e.g., from event messages from any source system) with feature flag data causing different treatments to be applied in applications. One embodiment for event attribution to feature flag data is discussed more fully in "Systems and Methods for Providing Event Attribution in Software Applications", issued on Mar. 2, 2021, which is incorporated herein by reference in its entirety. Beneficially, the attribution of events from different systems may be performed by feature data platform 110 without having to be instrumented in code by the application developer system. Furthermore, the event attribution can be performed automatically by feature data platform server 110 to further enrich the set(s) of feature contexts, which may intermingle feature flag data from different sources.

After events and feature flag data are attributed with one another, feature data platform server 110 may then provide insights into feature experimentation and impact of feature flag set(s) on events. This can include performing statistical analysis to determine when feature flag(s) (e.g., configuration of a feature or set of features) have a statistically significant impact on a metric of interest (e.g., a key performance indicator, which may be related to one of the attributed events). For example, is there a statistically significant influence on a metric of interest, is there a one-way movement of the metric in a positive or negative direction, etc. Such methods for analyzing the statistically significant impact of feature flag set(s) (e.g., treatments) on metrics of interest by feature data platform 110, and performing experimentation using feature flag deployments, are discussed more fully in application Ser. No. 15/198,498, entitled, "Systems and Methods for Providing Control of Application Execution", application Ser. No. 16/862,271, entitled "System and Methods for Real-Time Application Anomaly Detection and Configuration", and application Ser. No. 17/491,854, entitled "Systems and Methods for Multiple Comparison Correction During Configurable Application Feature Experiments", which are incorporated herein by reference in their entireties.

In embodiments, the feature level context data and statistical analysis results may then be provided to developer system 120ᵢ, as well as to one or more integration system(s) 140. That is, the statistical analysis results and/or notifications may be provided to an application developer system 120ᵢ via a user interface generated by feature data platform server 110 (e.g., showing feature flag data results, statistical analysis, etc. generated from impression event data as discussed herein), such as that illustrated in FIG. 7A. This data is enriched with the analysis, event attribution, and compilation of feature flag data generated across different sources. For example, a rollout board user interface may be generated detailing the status of various feature flags (from different sources) and their status within the application development pipeline (e.g., no status, pre-production, percentage in production, killed, testing, beta, ramping, experimenting, 100% released within the application development pipeline), as shown in FIG. 7B. As another example, a live tail user interface may be generated from collected feature flag data to visualize real time exposure of user system(s) to feature flags, based at least in part on timestamp data in feature flag reporting, as discussed below and as shown in FIG. 7C.

In embodiments, feature data platform server 110 further may use the feature data context to augment downstream service providers (e.g., integration system(s) 140). In embodiments, integration systems 140 are software-as-a-service (SaaS) systems that provide various services to application developer system 120i, such as data visibility, support desk services, marketing, webhooks, communications systems, etc. For example, a support desk service may receive a support ticket that identifies the user and the application for which support is needed. The support desk service ticket, prior to be forwarded to a service user of the developer, can be augmented with feature level context data (e.g., the set of flags a user was exposed to in an application for which a support request is received). Thus, the support worker is able to see the full user experience, feature flags, configurations, feature data context, etc., when responding to the user support request. Furthermore, the feature data platform server 110 is able to provide this augmentation by matching the user/application identification data and time of support ticket with stored impression data (e.g., feature flag data context). In an embodiment, the integration service receives this data in response to a request having identification data sufficient to identify what user/application and when the support service is applied to.

As another example, a data visibility service may provide visualizations to a developer system, such as system usage bandwidth, event occurrence (e.g., audits, crashes, etc.), time series graphs, user replay sessions, etc. In an embodiment, by knowing a development system, and applications and/or users, time series data (e.g., resource usage, event occurrences, clicks, navigation, etc.) can be augmented with feature level context data by the feature data platform server 110 retrieving impressions (e.g., feature contexts of sets of feature flags) and events attributed to impressions accessed by the feature data platform server 110.

As yet another example, event notifications services used by a developer system may use feature level context data to augment event notifications sent to users of the developer system. For example, instant, direct, text, email, or other messaging may be triggered by certain conditions (e.g. detected crashes by feature data platform exceeding a threshold, increased resource utilization exceeding a threshold, a predetermined number of service requests, etc.), and the messaging may be sent to an integration service 140 providing such messaging for a particular developer system. Additionally, the feature level context data with audit log data (e.g., which developer user is responsible for a feature flag) may be combined to determine specific developers to which the messaging is to be directed to. For example, if a user adds/edits a feature flag (e.g., audit log), that is then linked to an increase in crash reports (e.g., feature data platform server analysis), then that user via the integration service may be targeted with the crash report messaging including a feature level context within the report.

In embodiments, the augmentation of downstream data provider services and data with feature level context information occurs without effort on behalf of the developer system, and provides valuable insights into the application(s) being developed. Additionally, the feature level context data, time data, event data, etc., may intermingle feature flag data generated by different sources. However, because feature data platform server 110 ingests feature flag data from any source, the insights and data from the various different feature flag sources may be combined to enable a developer to have a more complete picture of their application development efforts.

Figure 2:
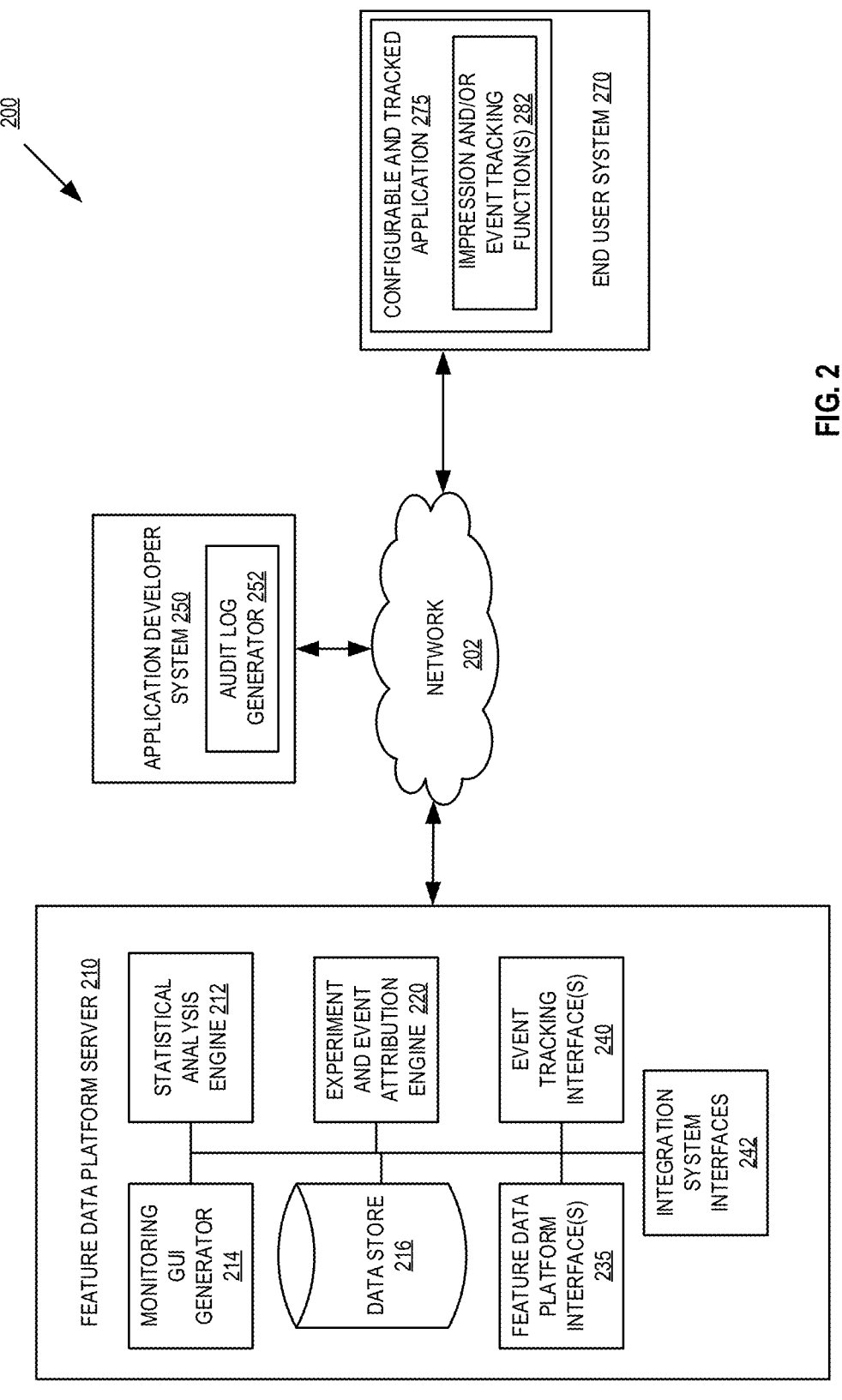
FIG. 2 is a block diagram of one embodiment of feature data platform server, an application developer system, and end user systems.

FIG. 2 is a block diagram of one embodiment 200 of a feature data platform server 210, end user system 270, and an application developer system 250. The systems illustrated in FIG. 2 provide additional details for the systems discussed above in FIG. 1. Furthermore, although only one application developer system 250 and one end user system 270 are illustrated, any number of such systems may be used consistent with the discussion herein.

In one embodiment, feature data platform server 210 includes feature data platform interface(s) 235 that are responsible for receiving the audit logs generated by audit log generator 252 of the developer system 250. In embodiments, the interface(s) 235 may be on or more application programming interface (API) endpoints of feature data platform server 210 that are configured to receive API based messaging. In an embodiment, audit logs generated by audit log generator 252 are generated using a SDK, web interface, or other resource of the feature data platform to identify the addition, deletion, or editing of feature flags (e.g., by generating identifier(s), metadata, and other data to identify feature flags within application 275), and uses API messaging to communicate the audit logs to feature data platform interface(s) 235. In embodiments, developer system 250 may use different feature flag deployments (e.g., open source, home grown, and/or provided by the feature data platform 210), and the audit log may receive the identification data from any of the different sources. The audit log data is then stored in data store 216 with sufficient data to identify feature flags from impression messages generated by functions 282 within application 275.

In embodiments, developer system 250 distributes configurable and tracked application 275 with impressions and/or event tracking functions 282 to end user system 270. The configurable and tracked application 275 is an application having feature flags within the application to enable real time configuration and testing of the application's feature(s) without having to distribute multiple application versions. Furthermore, the feature flags may be those of any number of systems (e.g., feature flags of the feature data platform system, of an open source feature flag system, of a home-grown system, a third party provider of feature flags, or a combination). In an embodiment, the application further includes the impressions and/or event tracking functions 282 to report impression events to feature data platform interface(s) 235. The impression events include feature flag data, identifiers, configuration values, timestamps, etc. that indicate what a user is exposed to when a feature flag (or set of feature flags) are evaluated within an application. Thus, the impression event reflects a real-time application configuration or treatment, and the impression event messages are used to communicate this information to feature data platform server 210.

Feature data platform interface(s) 335 and various applications are illustrated in greater detail in FIG. 3. In FIG. 3, data platform interface(s) 335 includes API endpoint 336, one or more translator(s) 337, and data store interface 338. API endpoint 336 is responsible for receiving feature flag data that is generated by different feature flag systems using a variety of approaches. In an embodiment, application 350 has impression and/or event tracking functions 352 having modified REST API messaging. That is, the REST API functions 352 are configured to transmit messages with feature flag reporting information to the API endpoint 335 directly with impression events. In another embodiment, application 360 has impression and/or event tracking functions 362 configured to communicate impression events to a synchronizer application 364. The synchronizer application 364 is a standalone and independent deployable service of the feature data platform server 210 configured to receive impression event messages (e.g., feature flag data) from functions 362, and configure an API based message, having the impression and/or event tracking information, sent to endpoint 336. In yet another embodiment, impression and/or event tracking functions 372 of application 370 log feature flag data to a local log 374. The log tailer 376 is also a standalone deployable server or library based application of the feature data platform server 210, which is responsible for parsing the log 374, extracting feature flag data from the log, and then transmitting the extracted feature flag data to the API endpoint 336 as an API based message, having the impression and/or event tracking information. Each of these approaches, or a combination of these approaches, may be used by a developer in different and/or the same application to report feature flag data to API endpoint 336 exposed by the feature data platform interface(s) 335.

Then, optionally one or more translators 337 are responsible for modifying the received feature flag data to a format consistent with that of the data stored in the data store. Data store interface 338 then stores the data in data store 216. Thus, regardless of the developer system approach to application deployment, the various approaches enable the application to transmit impression events with sets of one or more feature flag data to the feature data platform server 210, and beneficially, the feature data platform server 210 is able receive external feature flags, understand, ingest, and use feature flag data generated from any source, as discussed herein.

Returning to FIG. 2, statistical analysis engine 212 is responsible for performing analysis of the collected and/or intermingled feature flag data for a developer. First, events received at event tracking interface(s) 240 from external system (e.g., systems 150 not shown in FIG. 2) including behavioral, system, or other data, and are attributed to received impressions events messages with feature flag data from any source by the attribution engine 220, as discussed more fully in application Ser. No. 16/681,207, entitled "Systems and Methods for Providing Event Attribution in Software Applications", which is incorporated herein by reference in its entirety. Statistical analysis engine 212 then uses approaches for determining what flag or flags have a statistically significant impact on an application from the feature flag data and attributed events, including defining and then running experiments to test feature flag sets on different users and/or user groups, as discussed in application Ser. No. 15/198,498, entitled, "Systems and Methods for Providing Control of Application Execution", application Ser. No. 16/862,271, entitled "System and Methods for Real-Time Application Anomaly Detection and Configuration", and application Ser. No. 17/491,854, entitled "Systems and Methods for Multiple Comparison Correction During Configurable Application Feature Experiments", and application Ser. No. 16/681,207, entitled "Systems and Methods for Providing Event Attribution in Software Applications", which are incorporated herein by reference in its entirety.

In response to the analysis, monitoring and GUI generator 214 is responsible for responding to visualization requests, such as by generating the rollout board user interface (e.g., FIG. 7B), audit log user interface, experiments user interface, etc., using the feature data, feature contexts, attribution of events data, statistical analysis results, contained within data store 216.

Furthermore, integration system interface(s) 242 are responsible for adding feature level context data that augments the services provided by the integration system(s) 140 to the developer system 250. The feature level context data is that generated by the statistical analysis engine 212, experiment and event attribution engine 220, and the GUI generator 214 discussed above. Furthermore, as discussed herein, the integration system(s) 140 provide services to application developer system 250 (e.g., application support services, messaging services between developer system users, data visualization services for applications being developed, etc.), but may not be related to feature flag data generation, impressions reporting, events reporting, experimentation, of the other functions provided by feature data platform server 210. Rather, integration system(s) 140 are downstream systems that provide services to application developer system 250. In embodiments, integration system interface(s) 242 matches feature level context data to integration system requests (e.g., based on one or more identifiers included in the requests) to augment and enrich integration system services (e.g., by augmenting a support service ticket, a message between developer users, a data collection, etc. with feature context data). In some embodiments, integration system interface(s) 242 may generate messages proactively (e.g., independent of integration system requests) in response to detecting predetermined condition(s), such as in response to detecting an experiment threshold being satisfied, movement of a key performance indicator in a predefined direction, etc. When the predetermined condition(s) are detected, integrations system interface(s) 242 generate messages with data indicative of the feature level context, the detected condition(s), and then transmit those messages to the downstream integration systems 140 for augmenting the integration system services provided to the application developer system 250. By augmenting such integration system services, which support application development, more efficient and more intelligent application development and distribution by application developer system 250 may be realized. Furthermore, the augmentation of the integration system services occurs without effort on the part of the application developer system 250 and the integration system 140.

Figure 4:
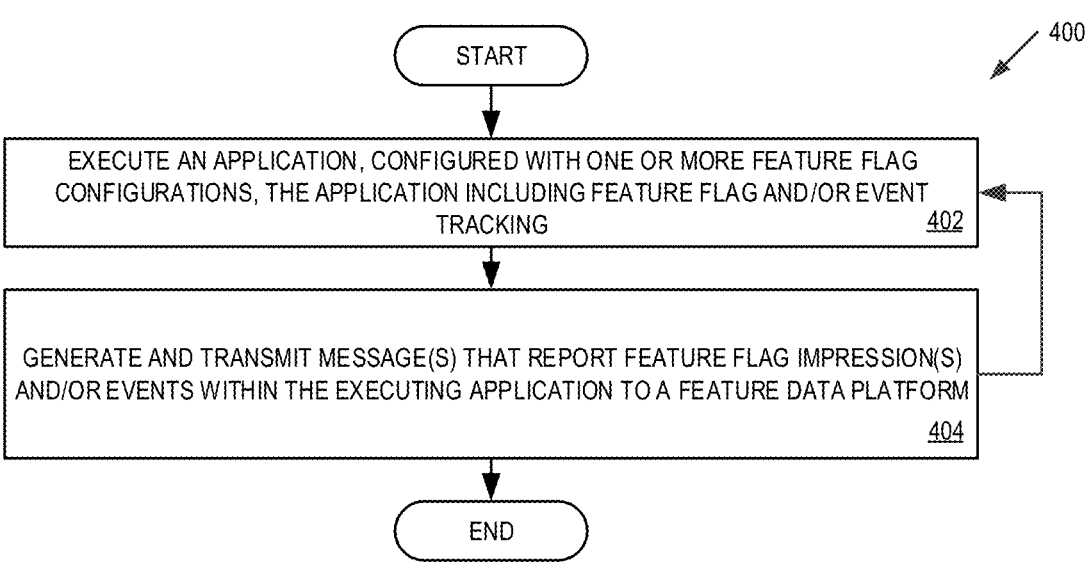
FIG. 4 is a flow diagram of one embodiment of a method for generating feature data.

FIG. 4 is a flow diagram of one embodiment of a method 400 for generating feature data. The method 400 is performed by processing logic that may comprise hardware (circuitry, dedicated logic, etc.), software (such as is run on a general purpose computer system or a dedicated machine), firmware, or a combination. In one embodiment, the method 400 is performed by a configurable and tracked application (e.g., application 350, 360, and/or 370).

Referring to FIG. 4, processing logic begins by executing an application that is configured with one or more feature flag configurations, the application having feature flag and/or event tracking (processing block 402). The application, as discussed herein, is that distributed by a developer system and includes feature flags for real time application configuration. However, to improve the value of the data generated by the feature flags, in embodiments, the application further uses feature flag and/or event tracking to gather and report feature flag data.

Processing logic then generates and transmits message(s) that report feature flag impression(s) and/or event(s) within the executing application to a feature data platform (processing block 404). As discussed herein, the application, upon evaluating a feature flag and/or set of feature flags, generates and transmits impression messages identifying the feature flag, flag value/configuration, user identifier, system identifier, software version, timestamp(s), and any other data related to the feature flag evaluation within the application. Additionally, event data may also be captured from the system executing the application, such as changes in processing resources, crashes, timing information, etc. This information related to behavioral event data (e.g., user behavior and/or system behavior), can also be transmitted. Furthermore, in embodiments, any of the approaches illustrated and discussed in FIG. 3 may be used in the generation and transmission of event and impression messages.

FIG. 5 is a flow diagram of one embodiment of a method 500 for a feature data platform server gathering external feature flags and determining feature data context from applications developed by multiple different developer systems. The method 500 is performed by processing logic that may comprise hardware (circuitry, dedicated logic, etc.), software (such as is run on a general purpose computer system or a dedicated machine), firmware, or a combination.

In one embodiment, the method 500 is performed by a feature data platform system (e.g., server 110 or 210, and 335).

Referring to FIG. 5, processing logic begins by receiving an audit log from a developer system indicative of the creation, updating, or deletion of feature flags (processing block 502). The audit log is a way for the developer system to transfer to processing logic data that enables processing logic to track feature flag impression data (e.g., user identifiers that may be anonymous to the feature data platform but not the developers, feature flag identifiers, software version identifiers, as well as other data).

Processing logic then receives feature flag impression messages from configurable and tracked applications executing at a plurality of end user systems (processing block 504). These messages are those generated when the application evaluates one or more feature flags. Furthermore, the feature flags may be from any of a number of different feature data generation systems (e.g., that of the feature data platform, an open source solution, a homegrown solution, a third party provider of feature flags, etc., as well as a combination). Despite the different internal and/or external feature flag sources, the receipt is via API messaging generated as a result of a parsed log (e.g., log tailer 376 results), messaging from synchronizer (e.g., an application of the feature data platform configured to generate and transmit API based messaging), and/or API based messaging (e.g., a configured REST API based messaging configured to communicate with an API endpoint of a feature data platform with event and feature flag data encapsulated in the API message in a predefined format).

Simultaneous with processing block 504, processing logic also receives event messages from a plurality of event systems (processing block 506). The event systems, as discussed herein, are third party and remote systems that track user and/or system behavior for an executing application. For example, page load time, processing resources, accessing a system, etc., which are not part of executing the application, may also be transmitted to the feature data platform. The event data also includes identification data, timestamp data, etc. for use in event attribution, as defined in the received audit log.

Processing logic translates (if needed) the audit log, feature flag impressions, and/or event messages into a common format of the feature data platform (processing block 508). That is, the processing logic may modify incoming data (e.g., audit logs, events, impressions) to a common format so that data, regardless of source, is stored in the same format that is compatible with the services and functions of the feature data platform (e.g., providing a live tail, performing statistical analysis for experimentation, populating a rollout board, etc.). The collection of data (translated when needed) is then stored in a data store (processing block 510).

Processing logic then determines event attribution for the feature flag impression(s) using the collection of data to generate a set of feature flags associated with events (processing block 512). The set of feature flags form a feature data context associated with the attributed event. That is, the feature flags represent the various configurations that a particular user was exposed to within an application and when, relating the set of feature flags to the event, to provide a more complete picture of an application treatment a user is exposed to.

Processing logic then performs statistical analysis using the events and sets of feature flag(s) to determine an impact of context and/or individual feature flag(s) on events (processing block 514). The analysis, as discussed herein, is a statistical analysis that determines statistically significant impacts of a flag or sets of flags on an event. This statistical analysis uses the collected data and attributed events. Furthermore, since the collected data has data from the multiple flag data generation sources, and may then be commingled after translation, a fuller and richer set of data from which to make the analysis is performed.

Following the analysis, processing logic configures and sends one or more messages to one or more integration systems including data indicative of feature level contexts (e.g., collections of one or more feature flags associated with an impression and/or event), the contexts including the feature flag(s) associated with the events, and/or the statistical analysis results (processing block 516). The messaging with the integration systems results in the coupling of feature flag context intelligence (e.g., feature flag(s) and/or context statistically relevant to events) to the services of the integration systems to enrich the services for the development services. For example, a service ticket may be augmented to include feature flags a user was exposed to prior to generating a support ticket. The support personnel may then use the extra feature flag data to get a more accurate picture of the application experience of the user (as an application identifier of an executable binary does not necessarily reflect the actual user experience with feature flag configurations).

Processing logic also generates one or more user interface(s) based on the sets of feature flag(s) associated with events and/or the statistical analysis results to cause rendering of the user interfaces and developer user systems (processing block 518). The user interfaces may include various relevant data for the application developer, such as live feature exposure results via a live tail user interface, a rollout board to view a status of features, experiment and/or statistical analysis results indicative of feature(s) importance on an event, as well as other interfaces useful in displaying feature flag analysis results.

Therefore, as discussed herein, the feature development platform and server enable the collection and storage of feature flag impressions from any number of disparate sources, with minimal effort on those sources, to decouple feature flags from the platforms generating those feature flags. Then, a collection of feature flag data may be collected providing a fuller and richer picture of configurable application execution, by way of statistical analysis of a improved data set. This feature flag analysis further enables a context to be determined for an event, which is a set of feature flag(s) (regardless of source) that are determined to be associated with the event. Having this context information enables the feature data platform to better analyze feature flags on application performance, and to surface this feature level context data to downstream services used by the developer system that can benefit from such information. Again, the downstream services provide their augmented services to the developer systems with minimal to no effort on the part of the developer and downstream system.

Figure 6:
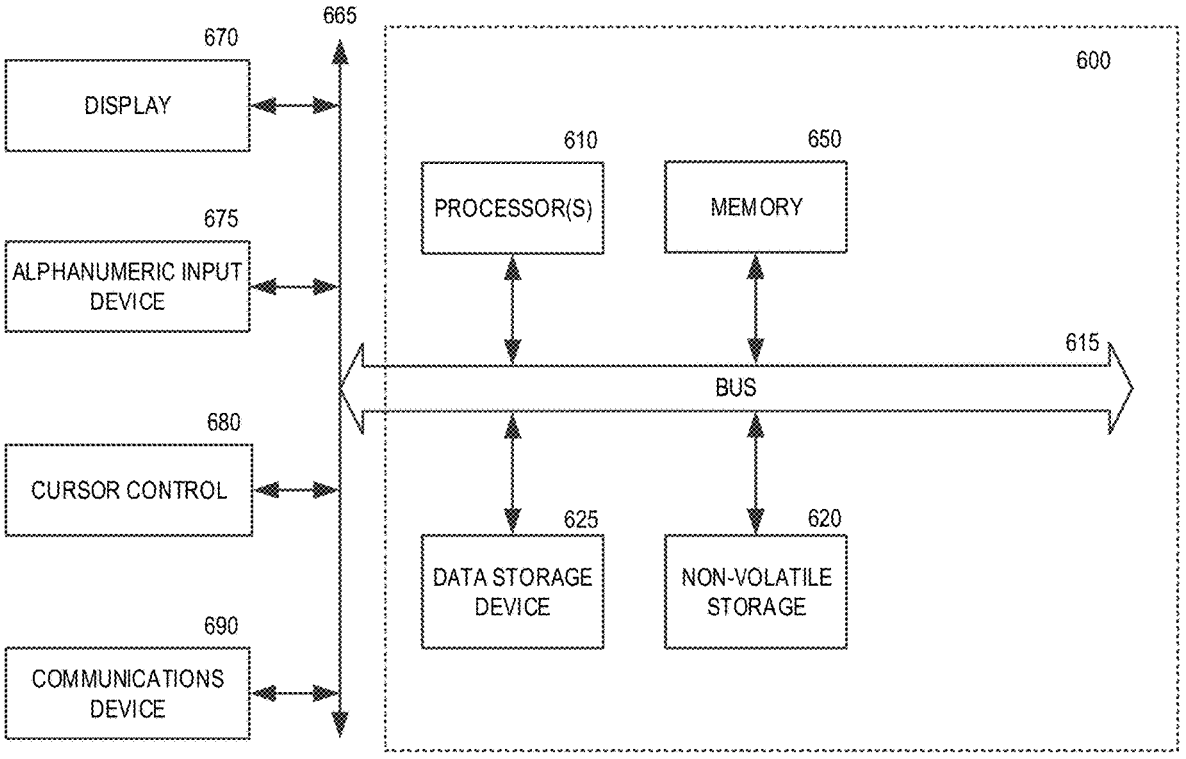
FIG. 6 is one embodiment of a computer system that may be used in accordance with an embodiment of the invention.

FIG. 6 is one embodiment of a computer system that may be used with the present invention, for example, to implement feature data platform server, application developer systems, event systems, integration systems, and/or end user systems. It will be apparent to those of ordinary skill in the art, however that other alternative systems of various system architectures may also be used.

The data processing system illustrated in FIG. 6 includes a bus or other internal communication means 615 for communicating information, and at least one processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED), a liquid crystal display (LCD), or other display, coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a non-transitory computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method for configurable application feature testing, comprising:

receiving, from an application developer system, an audit log associated with a set of feature flags embedded within a configurable application, wherein the set of features flags controls functionality of the configurable application by controlling treatment of one or more features of the configurable application during execution of the application, wherein a first configuration of the set of feature flags results in a first treatment when the configurable application is executed and wherein a second configuration of the set of feature flags results in a second treatment when the configurable application is executed, wherein the audit log indicative of at least one of a creating, an updating, or a deleting of a feature flag within the set of feature flags and providing a definition of a format of feature flag impression messages generated by the configurable application;

receiving, from the configurable application, a feature flag impression message, the feature flag impression message indicative of a configuration of the set of feature flags to which a user of the application was exposed to during execution of the application;

translating the feature flag impression message into a common format of a feature data platform based on the definition of the format of the feature flag impression messages, wherein translating includes modifying incoming data to a common format compatible with feature data platform services and functions;

storing the translated feature flag impression message in a data store; and

determining event attribution for the feature flag impression message using the translated feature flag impression message to generate a set of feature flags associated with one or more events.

2. The method of claim 1, further comprising:
receiving, from an event system, an event message, the event message associated with an event;
translating the event message into the common format of the feature data platform; and
storing the translated event message in the data store.

3. The method of claim 2, further comprising:
attributing the event to the configuration of the set of feature flags to which the user of the application was exposed to during execution of the application, using at least one of the feature flag impression message or the event message; and
performing statistical analysis of the event and the set of feature flags to determine an impact, associated with the set of feature flags, on a set of events.

4. The method of claim 3, further comprising:
as a result of the performing, generating a user interface based on the set of feature flags associated with at least one of the statistical analysis, the generating to cause a rendering of the user interface.

5. The method of claim 3, further comprising: sending a message to an integration system, the message comprising at least one of feature level contexts or events generated from the feature flag impression messages, the feature level contexts including at least data indicative of feature flags associated with the event or the statistical analysis, and the feature level contexts of message causing the integration system to integrate the feature level contexts or the event into a service of the integration system.

6. The method of claim 1, wherein the first treatment and the second treatment provide different user experiences when the configurable application is executed.

7. The method of claim 1, wherein the configuration of the set of feature flags impacts at least one or more of a functionality, performance or efficacy of the configurable application when executed.

8. The method of claim 1, wherein the storing includes matching a feature flag definition from the audit log to a feature flag associated with the feature flag impression message.

9. The method of claim 8, wherein the feature flag impression message includes at least one or more of an identifier, a timestamp, or a metadata.

10. The method of claim 1, wherein the feature flag impression message is communicated via an application programming interface (API).

11. The method of claim 1, wherein the one or more events is generated by a device executing the configurable application, and wherein the one or more events is associated with execution of the configurable application and its efficacy and wherein the one or more events is not generated by the configurable application.

12. A system for providing a feature data platform, comprising: a memory; and a processor coupled with the memory configured to perform operations, comprising: receiving, from an application developer system, an audit log associated with a set of feature flags embedded within a configurable application, wherein the set of features flags controls functionality of the configurable application by controlling treatment of one or more features of the configurable application during execution of the application, wherein a first configuration of the set of feature flags results in a first treatment when the configurable application is executed and wherein a second configuration of the set of feature flags results in a second treatment when the configurable application is executed, wherein the audit log indicative of at least one of a creating, an updating, or a deleting of a feature flag within the set of feature flags and providing a definition of a format of feature flag impression messages generated by the configurable application;
receiving, from the configurable application, a feature flag impression message, the feature flag impression message indicative of a configuration of the set of feature flags to which a user of the application was exposed to during execution of the application;
translating the feature flag impression message into a common format of a feature data platform based on the definition of the format of the feature flag impression messages, wherein translating includes modifying incoming data to a common format compatible with feature data platform services and functions;
storing the translated feature flag impression message in a data store; and
determining event attribution for the feature flag impression message using the translated feature flag impression message to generate a set of feature flags associated with one or more events.

13. The system of claim 12, wherein the first treatment and the second treatment provide different user experiences when the configurable application is executed.

14. The system of claim 12, wherein the configuration of the set of feature flags impacts at least one or more of a functionality, performance or efficacy of the configurable application when executed.

15. The system of claim 12, wherein the storing includes matching a feature flag definition from the audit log to a feature flag associated with the feature flag impression message.

16. The system of claim 15, wherein the feature flag impression message includes at least one or more of an identifier, a timestamp, or a metadata.

17. The system of claim 12, wherein the feature flag impression message is communicated via an application programming interface (API).

18. The system of claim 12, wherein the one or more events is generated by a device executing the configurable application, and wherein the one or more events is associated with execution of the configurable application and its efficacy and wherein the one or more events is not generated by the configurable application.

19. A non-transitory computer readable storage medium having instructions stored thereon, which when executed by a computer processing system cause the computer processing system to perform operations for providing a feature data platform, the operations comprising: receiving, from an application developer system, an audit log associated with a set of feature flags embedded within a configurable application, wherein the set of features flags controls functionality of the configurable application by controlling treatment of one or more features of the configurable application during execution of the application, wherein a first configuration of the set of feature flags results in a first treatment when the configurable application is executed and wherein a second configuration of the set of feature flags results in a second treatment when the configurable application is executed, wherein the audit log indicative of at least one of a creating, an updating, or a deleting of a feature flag within the set of feature flags and providing a definition of a format of feature flag impression messages generated by the configurable application;

receiving, from the configurable application, a feature flag
impression message, the feature flag impression mes-
sage indicative of a configuration of the set of feature
flags to which a user of the application was exposed to
during execution of the application;
translating the feature flag impression message into a
common format of a feature data platform based on the
definition of the format of the feature flag impression
messages, wherein translating includes modifying
incoming data to a common format compatible with
feature data platform services and functions;
storing the translated feature flag impression message in
a data store; and
determining event attribution for the feature flag impres-
sion message using the translated feature flag impression message to generate a set of feature flags associ-
ated with one or more events.

20. The non-transitory computer readable storage medium
of claim 19, wherein the first treatment and the second
treatment provide different user experiences when the configurable application is executed.

\* \* \* \* \*